US00RE48204E

(19) United States
(12) Reissued Patent
Sabo et al.

(10) Patent Number: US RE48,204 E
(45) Date of Reissued Patent: Sep. 15, 2020

(54) METHOD AND APPARATUS FOR LIMITING ACIDIC CORROSION IN FUEL DELIVERY SYSTEMS

(71) Applicant: Franklin Fueling Systems, LLC, Madison, WI (US)

(72) Inventors: Lorraine Vander Wielen Sabo, Sun Prairie, WI (US); William Nelson, Lake Mills, WI (US)

(73) Assignee: Franklin Fueling Systems, Inc., Madison, WI (US)

(21) Appl. No.: 16/117,845

(22) Filed: Aug. 30, 2018

Related U.S. Patent Documents

Reissue of:
(64) Patent No.: 9,428,375
Issued: Aug. 30, 2016
Appl. No.: 13/965,911
Filed: Aug. 13, 2013

U.S. Applications:
(60) Provisional application No. 61/691,994, filed on Aug. 22, 2012.

(51) Int. Cl.
*G08B 21/00* (2006.01)
*B67D 7/32* (2010.01)
*B67D 7/04* (2010.01)

(52) U.S. Cl.
CPC ..... *B67D 7/3281* (2013.01); *B67D 7/0498* (2013.01); *B67D 7/32* (2013.01)

(58) Field of Classification Search
CPC ..... B67D 7/3281; B67D 7/32; B67D 7/0498
See application file for complete search history.

(56) References Cited

U.S. PATENT DOCUMENTS

| | | | |
|---|---|---|---|
| 2,853,149 | A | 9/1958 | Gosselin |
| 3,885,588 | A | 5/1975 | Shotmeyer |
| 3,908,690 | A | 9/1975 | Shotmeyer |
| 3,915,206 | A | 10/1975 | Fowler et al. |
| 3,952,781 | A | 4/1976 | Hiller et al. |
| 4,620,669 | A | 11/1986 | Polk |

(Continued)

FOREIGN PATENT DOCUMENTS

| | | | |
|---|---|---|---|
| CA | 1185693 A1 | 4/1985 | |
| CA | 2815917 A1 * | 5/2012 | ..... G01N 17/00 |

(Continued)

OTHER PUBLICATIONS

M. Lorenzini et al., "Ultraviolet Light (UV-C) Irradiation as an Alternative Technology for the Control of Microorganisms in Grape Juice and Wine," 2010, 8 pages.

(Continued)

*Primary Examiner* — Ovidio Escalante
(74) *Attorney, Agent, or Firm* — Faegre Drinker Biddle & Reath LLP

(57) ABSTRACT

A method and apparatus are provided for monitoring a fuel delivery system to limit acidic corrosion. An exemplary monitoring system includes a controller, at least one monitor, and an output. The monitoring system may collect and analyze data indicative of a corrosive environment in the fuel delivery system. The monitoring system may also automatically warn an operator of the fueling station of the corrosive environment so that the operator can take preventative or corrective action.

19 Claims, 4 Drawing Sheets

(56) References Cited

U.S. PATENT DOCUMENTS

| | | | | |
|---|---|---|---|---|
| 4,760,863 | A | 8/1988 | Broer | |
| 4,770,317 | A | 9/1988 | Podgers et al. | |
| 4,951,844 | A | 8/1990 | Sharp | |
| 5,122,264 | A | 6/1992 | Mohr et al. | |
| 5,156,047 | A * | 10/1992 | Tuma | G01F 23/24 340/620 |
| 5,160,605 | A | 11/1992 | Noestheden | |
| 5,376,215 | A * | 12/1994 | Ohta et al. | 156/345.24 |
| 5,409,025 | A | 4/1995 | Semler et al. | |
| 5,490,490 | A * | 2/1996 | Weber | F02D 41/1451 123/697 |
| 5,586,586 | A | 12/1996 | Fiech | |
| 6,374,187 | B1 | 4/2002 | Knight et al. | |
| 6,811,681 | B2 | 11/2004 | Dowling et al. | |
| 6,907,899 | B2 | 6/2005 | Yu et al. | |
| 7,051,579 | B2 | 5/2006 | Kenney et al. | |
| 7,114,490 | B2 | 10/2006 | Zdroik | |
| 7,523,770 | B2 | 4/2009 | Horowitz et al. | |
| 7,704,383 | B2 | 4/2010 | Zulauf et al. | |
| 7,726,336 | B2 | 6/2010 | Dolson | |
| 7,883,627 | B1 | 2/2011 | Barrett | |
| 8,141,577 | B2 | 3/2012 | Wyper et al. | |
| 8,282,023 | B2 | 10/2012 | Olander et al. | |
| 8,290,111 | B1 * | 10/2012 | Pop et al. | 376/259 |
| 8,417,188 | B1 * | 4/2013 | Vosburgh | B63C 11/48 455/66.1 |
| 9,428,375 | B2 | 8/2016 | Sabo et al. | |
| 9,440,843 | B2 | 9/2016 | Polzin | |
| 9,530,290 | B2 | 12/2016 | Hutchinson | |
| 9,546,959 | B2 | 1/2017 | Indo et al. | |
| 10,239,745 | B2 | 7/2017 | Cornett et al. | |
| 2002/0109080 | A1 * | 8/2002 | Tubel | E21B 23/03 250/227.14 |
| 2004/0020271 | A1 | 2/2004 | Hutchinson | |
| 2005/0000853 | A1 | 1/2005 | Jenkins et al. | |
| 2005/0008532 | A1 * | 1/2005 | Jenkins et al. | C23F 11/149 422/14 |
| 2006/0207430 | A1 | 9/2006 | Huang et al. | |
| 2008/0174323 | A1 * | 7/2008 | Raju | G01N 17/02 324/700 |
| 2009/0000602 | A1 | 1/2009 | Clover | |
| 2009/0006026 | A1 | 1/2009 | Clover | |
| 2009/6000602 | | 1/2009 | Clover | |
| 2009/0045925 | A1 * | 2/2009 | Demin | B67D 7/3236 340/12.32 |
| 2009/0114676 | A1 | 5/2009 | Showers et al. | |
| 2009/0173698 | A1 | 7/2009 | Sundeng | |
| 2010/0235107 | A1 * | 9/2010 | Fukumura | G01N 27/226 702/24 |
| 2010/0276424 | A1 | 11/2010 | Ross | |
| 2010/0295565 | A1 * | 11/2010 | Drack | G01F 23/243 324/693 |
| 2011/0193027 | A1 * | 8/2011 | Mackenzie | C09K 8/54 252/389.23 |
| 2011/0259088 | A1 * | 10/2011 | Fisher et al. | 73/61.43 |
| 2012/0009588 | A1 * | 1/2012 | Rajagopal | B01L 3/5082 435/6.15 |
| 2012/0206253 | A1 * | 8/2012 | Taniguchi | G01N 33/2835 340/438 |
| 2013/0256161 | A1 * | 10/2013 | Crary et al. | 206/216 |
| 2013/0320214 | A1 * | 12/2013 | Yamashita | G01N 21/27 250/338.4 |
| 2013/0341333 | A1 | 12/2013 | Herdman et al. | |
| 2014/0053943 | A1 | 2/2014 | Sabo et al. | |
| 2019/0062142 | A1 | 2/2019 | Bevins et al. | |

FOREIGN PATENT DOCUMENTS

| | | |
|---|---|---|
| CN | 2665230 | 12/2004 |
| EP | 0718216 | 6/1996 |
| EP | 2567944 | 7/2015 |
| FR | 2 908 760 | 5/2008 |
| GB | 2129329 | 5/1984 |
| JP | 2005076070 | 3/2005 |
| JP | 2010116842 | 5/2010 |
| WO | 98/32693 | 7/1998 |
| WO | 9945272 | 9/1999 |
| WO | 0040943 A2 | 11/2000 |
| WO | 2008059288 | 5/2008 |
| WO | 2012172286 | 12/2012 |

OTHER PUBLICATIONS

U.S. Environmental Protection Agency, "Investigation of Corrosion-Influencing Factors in Underground Storage Tanks With Diesel Service," EPA 500-R-16-001, Jul. 2016, 68 pages.

Clean Diesel Fuel Alliance, "Guidance for Underground Storage Tank Management at ULSD Dispensing Facilities," available at least as early as May 23, 2017, 10 pages.

Steel Tank Institute, "Steel Tank Institute Recommended Practice for Storage Tank Maintenance," R111 Revision, 2nd Edition, Mar. 2016. 21 pages.

Uptime Institute, "Reconsider Your Diesel Fuel Supply," printed Jun. 7, 2017, 11 pages.

Battelle Memorial Institute, Corrosion in Systems Storing and Dispensing Ultra Low Sulfur Diesel (ULSD), Hypotheses Investigation, Sep. 5, 2012.

PEI Journal, "The Big 'E'", 2nd Quarter, 2011.

John T. Wilson, et al., "Relationship Between Ethanol in Fuel and Corrosion in STP Sumps", available at least as early as Apr. 3, 2102.

U.S. Environmental Protection Agency, "ETVoice", Jan./Feb. 2012.

"Biochemistry of Acetic Bacteria", available online at https://people.ok.ubc.ca/neggers/Chem422A/Biochemistry%20OF%20ACETIC%20ACID%20BACTERIA.pdf, at least as early as Mar. 2012.

United Syayes EPA, "UST Systems: Inspecting and Maintaining Sumps and Spill Buckets", available online at http://www.epa/gov/oust/pubs/sumps/%20manual%204-28-05.pdf, at least as early as Jul. 2012.

Ed Fowler, et al., "Ethanol Related Corrosion in Submersible Turbine Pump Sumps (STPs)", presentation dated Mar. 2011, presentation available online at http://www.astswmo.org/Files/Meetings/2011/2011-UST_CP_Workshop/FOWLER-STPcorrosionEPA3.SGPP.pdf, at least as early as Feb. 23, 2012.

International Preliminary Report on Patentability mailed Feb. 24, 2015 from the International Bureau in related International Patent Application No. PCT/US2013/054734.

International Search Report dated Feb. 5, 2014 in corresponding International Application No. PCT/US2013/054734.

* cited by examiner

METHOD AND APPARATUS FOR LIMITING ACIDIC CORROSION IN FUEL DELIVERY SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. Pat. No. 9,428,375, issued Aug. 30, 2016, which* claims priority from U.S. Provisional Patent Application Ser. No. 61/691,994, filed Aug. 22, 2012, the disclosures of which are hereby expressly incorporated by reference herein in their entirety.

FIELD OF THE DISCLOSURE

The present disclosure relates to monitoring fuel delivery systems and, in particular, to a method and apparatus for monitoring fuel delivery systems to limit acidic corrosion.

BACKGROUND OF THE DISCLOSURE

A fuel delivery system typically includes one or more underground storage tanks that store various fuel products and one or more fuel dispensers that dispense the fuel products to consumers. The underground storage tanks may be coupled to the fuel dispensers via corresponding underground fuel delivery lines.

In the context of an automobile fuel delivery system, for example, the fuel products may be delivered to consumers' automobiles. In such systems, the fuel products may contain a blend of gasoline and alcohol, specifically ethanol. Blends having about 2.5 vol. % ethanol ("E-2.5"), 5 vol. % ethanol ("E-5"), 10 vol. % ethanol ("E-10"), or more, in some cases up to 85 vol. % ethanol ("E-85"), are now available as fuel for cars and trucks in the United States and abroad.

Sumps (i.e., pits) may be provided around the equipment of the fuel delivery system. Such sumps may trap liquids and vapors to prevent environmental releases. Also, such sumps may facilitate access and repairs to the equipment. Sumps may be provided in various locations throughout the fuel delivery system. For example, dispenser sumps may be located beneath the fuel dispensers to provide access to piping, connectors, valves, and other equipment located beneath the fuel dispensers. As another example, turbine sumps may be located above the underground storage tanks to provide access to turbine pump heads, piping, leak detectors, electrical wiring, and other equipment located above the underground storage tanks.

Underground storage tanks and sumps may experience premature corrosion. Efforts have been made to control such corrosion with fuel additives, such as biocides and corrosion inhibitors. However, the fuel additives may be ineffective against certain microbial species, become depleted over time, and cause fouling, for example. Efforts have also been made to control such corrosion with rigorous and time-consuming water maintenance practices, which are typically disfavored by retail fueling station operators.

SUMMARY

The present disclosure relates to a method and apparatus for monitoring a fuel delivery system to limit acidic corrosion. An exemplary monitoring system includes a controller, at least one monitor, and an output. The monitoring system may collect and analyze data indicative of a corrosive environment in the fuel delivery system. The monitoring system may also automatically warn an operator of the fueling station of the corrosive environment so that the operator can take preventative or corrective action.

According to an embodiment of the present disclosure, a fuel delivery system is provided including a storage tank containing a fuel product, a fuel delivery line in communication with the storage tank, at least one monitor that collects data indicative of a corrosive environment in the fuel delivery system, and a controller in communication with the at least one monitor to receive collected data from the at least one monitor, the controller being programmed to issue a warning based on the collected data from the at least one monitor.

According to another embodiment of the present disclosure, a method is provided for monitoring a fuel delivery system and includes the steps of directing a fuel product from a storage tank to a fuel dispenser via a fuel delivery line, collecting data indicative of a corrosive environment in the fuel delivery system, and issuing a warning based on the collected data.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
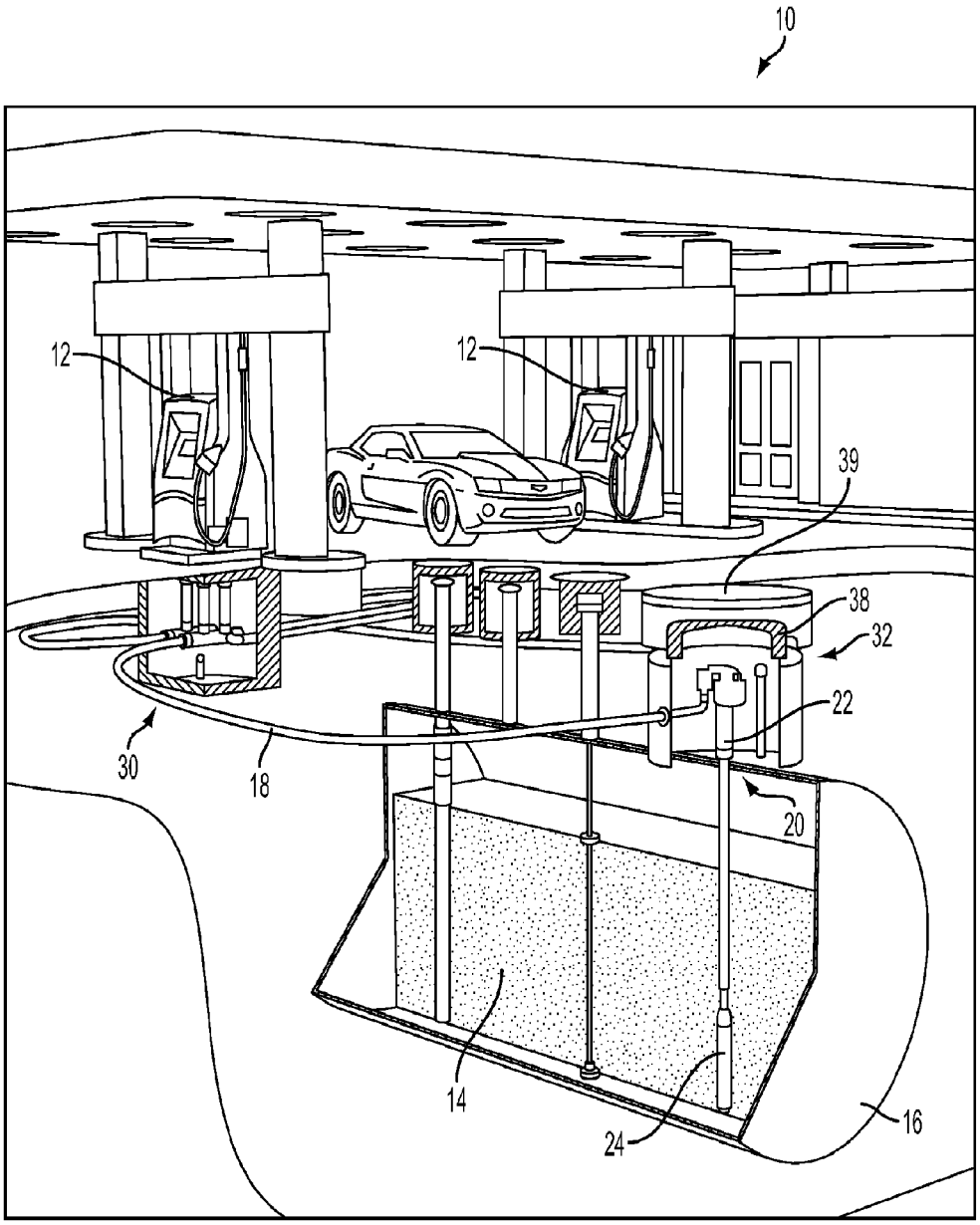
FIG. 1 depicts an exemplary fuel delivery system of the present disclosure showing above ground components, such as a fuel dispenser, and below ground components, such as a storage tank containing a fuel product, a fuel delivery line, a turbine sump, and a dispenser sump.

An exemplary fuel delivery system 10 is shown in FIG. 1. Fuel delivery system 10 includes a fuel dispenser 12 for dispensing a liquid fuel product 14 from a liquid storage tank 16 to consumers. Each storage tank 16 is fluidly coupled to one or more dispensers 12 via a corresponding fuel delivery line 18. Storage tank 16 and delivery line 18 are illustratively positioned underground, but it is also within the scope of the present disclosure that storage tank 16 and/or delivery line 18 may be positioned above ground.

Fuel delivery system 10 of FIG. 1 also includes a pump 20 to draw fuel product 14 from storage tank 16 and to convey fuel product 14 through delivery line 18 to dispenser 12. Pump 20 is illustratively a submersible turbine pump ("STP") having a turbine pump head 22 located above storage tank 16 and a submersible motor 24 located inside storage tank 16. However, it is within the scope of the present disclosure that other types of pumps may be used to transport fuel product 14 through fuel delivery system 10.

Figure 2:
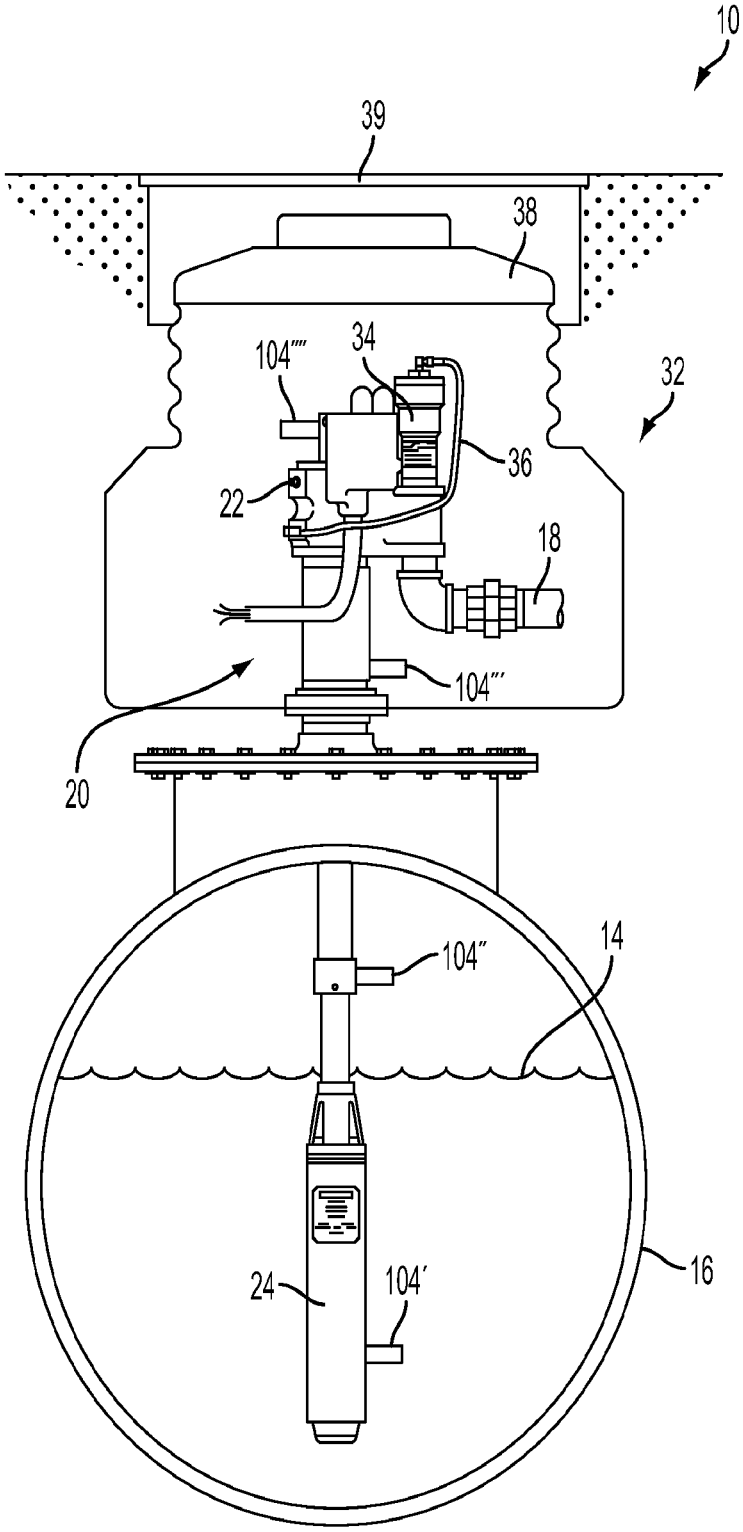
FIG. 2 is a cross-sectional view of the storage tank and the turbine sump of FIG. 1.

Fuel delivery system 10 of FIG. 1 further includes various underground sumps (i.e., pits). A first, dispenser sump 30 is provided beneath dispenser 12 to protect and provide access to piping (e.g., delivery line 18), connectors, valves, and other equipment located therein, and to contain any materials that may be released beneath dispenser 12. A second, turbine sump 32, which is also shown in FIG. 2, is provided above storage tank 16 to protect and provide access to pump 20, piping (e.g., delivery line 18), leak detector 34, electrical wiring 36, and other equipment located therein. Turbine sump 32 is illustratively capped with an underground lid 38 and a ground-level manhole cover 39, which protect the equipment inside turbine sump 32 when installed and allow access to the equipment inside turbine sump 32 when removed.

According to an exemplary embodiment of the present disclosure, fuel delivery system 10 is an automobile fuel delivery system. In this embodiment, fuel product 14 may be a gasoline/ethanol blend that is delivered to consumers' automobiles, for example. The concentration of ethanol in the gasoline/ethanol blended fuel product 14 may vary from 0 vol. % to 15 vol. % or more. For example, fuel product 14 may contain about 2.5 vol. % ethanol ("E-2.5"), about 5 vol. % ethanol ("E-5"), about 7.5 vol. % ethanol ("E-7.5"), about 10 vol. % ethanol ("E-10"), about 15 vol. % ethanol ("E-15"), or more, in some cases up to about 85 vol. % ethanol ("E-85").

In addition to being present in storage tank 16 as part of the gasoline/ethanol blended fuel product 14, ethanol may find its way into other locations of fuel delivery system 10 in a vapor or liquid state, including dispenser sump 30 and turbine sump 32. In the event of a fluid leak from dispenser 12, for example, some of the gasoline/ethanol blended fuel product 14 may drip from dispenser 12 into dispenser sump 30 in a liquid state. Also, in the event of a vapor leak from storage tank 16, ethanol vapor in the ullage of storage tank 16 may escape from storage tank 16 and travel into turbine sump 32. In certain situations, turbine sump 32 and/or components contained therein (e.g., metal fittings, metal valves, metal plates) may be sufficiently cool in temperature to condense the ethanol vapor back into a liquid state in turbine sump 32. Along with ethanol, water from the surrounding soil or another source may also find its way into sumps 30, 32 in a vapor or liquid state, such as by dripping into sumps 30, 32 in a liquid state or by evaporating and then condensing in sumps 30, 32. Ethanol and/or water vapor leaks into sumps 30, 32 may occur through various connection points in sumps 30, 32, for example. Ethanol and/or water may escape from ventilated sumps 30, 32 but may become trapped in unventilated sumps 30, 32.

In the presence of certain bacteria, ethanol that is present in fuel delivery system 10 may be oxidized to produce acetate, according to Reaction I below. The acetate may then be protonated to produce acetic acid, according to Reaction II below.

$$CH_3CH_2OH+H_2O \rightarrow CH_3COO^-+H^++2H_2 \quad \text{(I)}$$

$$CH_3COO^-+H^+ \rightarrow CH_3COOH \quad \text{(II)}$$

The conversion of ethanol to acetic acid may also occur in the presence of oxygen according to Reaction III below.

$$2CH_3CH_2OH+O_2 \rightarrow 2CH_3COOH+2H_2O \quad \text{(III)}$$

Acetic acid producing bacteria may produce acetate and acetic acid by a metabolic fermentation process, which is used commercially to produce vinegar, for example. Acetic acid producing bacteria generally belong to the Acetobacteraceae family, which includes the genera Acetobacter and Gluconobacter. Acetic acid producing bacteria are very prevalent in nature and may be present in the soil around fuel delivery system 10, for example. Such bacteria may find their way into sumps 30, 32 to drive Reactions I-III above, such as when soil or debris falls into sumps 30, 32 or when rainwater seeps into sumps 30, 32.

The products of Reactions I-III above may reach equilibrium in sumps 30, 32, with some of the acetate and acetic acid dissolving into liquid water that is present in sumps 30, 32, and some of the acetate and acetic acid volatilizing into a vapor state. In general, the amount acetate or acetic acid that is present in the vapor state is proportional to the amount of acetate or acetic acid that is present in the liquid state (i.e, the more acetate or acetic acid that is present in the vapor state, the more acetate or acetic acid that is present in the liquid state).

Even though acetic acid is classified as a weak acid, it may be corrosive to fuel delivery system 10, especially at high concentrations. For example, the acetic acid may react to deposit metal oxides (e.g., rust) or metal acetates on metallic fittings of fuel delivery system 10. Because Reactions I-III are microbiologically-influenced reactions, these deposits in fuel delivery system 10 may be tubular or globular in shape.

Figure 3:
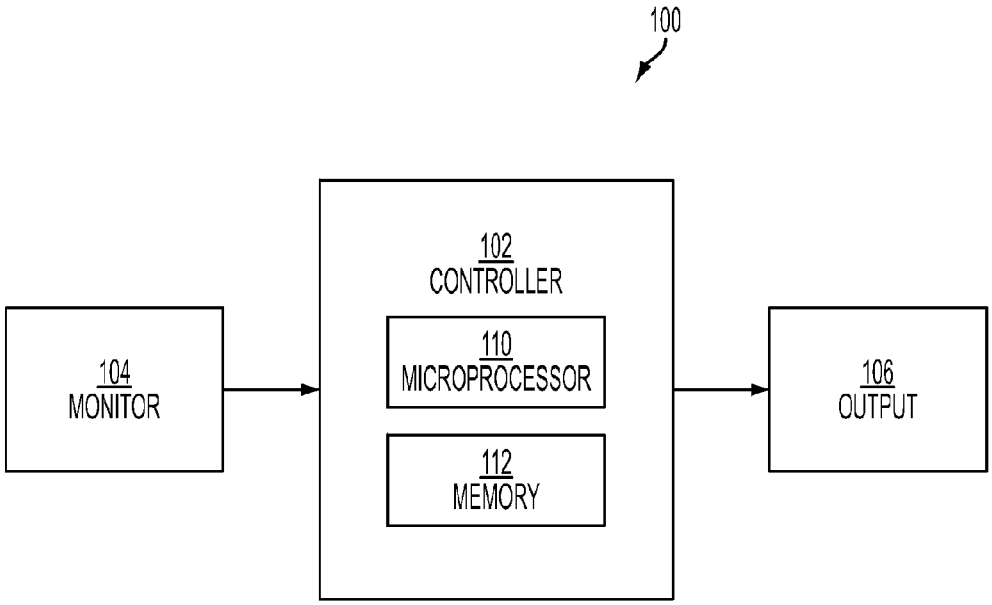
FIG. 3 is a schematic view of an exemplary monitoring system of the present disclosure, the monitoring system including a controller, at least one monitor, and an output.

To limit corrosion in fuel delivery system 10, a monitoring system 100 and a corresponding monitoring method are provided herein. As shown in FIG. 3, the illustrative monitoring system 100 includes controller 102, one or more monitors 104 in communication with controller 102, and output 106 in communication with controller 102, each of which is described further below.

Controller 102 of monitoring system 100 illustratively includes a microprocessor 110 (e.g., a central processing unit (CPU)) and an associated memory 112. Controller 102 may be any type of computing device capable of accessing a computer-readable medium having one or more sets of instructions (e.g., software code) stored therein and executing the instructions to perform one or more of the sequences, methodologies, procedures, or functions described herein. In general, controller 102 may access and execute the instructions to collect, sort, and/or analyze data from monitor 104, determine an appropriate response, and communicate the response to output 106. Controller 102 is not limited to being a single computing device, but rather may be a collection of computing devices (e.g., a collection of computing devices accessible over a network) which together execute the instructions. The instructions and a suitable operating system for executing the instructions may reside within memory 112 of controller 102, for example. Memory 112 may also be configured to store real-time and historical data and measurements from monitors 104, as well as reference data. Memory 112 may store information in database arrangements, such as arrays and look-up tables.

Controller 102 of monitoring system 100 may be part of a larger controller that controls the rest of fuel delivery system 10. In this embodiment, controller 102 may be capable of operating and communicating with other components of fuel delivery system 10, such as dispenser 12 (FIG. 1), pump 20 (FIG. 2), and leak detector 34 (FIG. 2), for example. An exemplary controller 102 is the TS-550 Fuel Management System available from Franklin Fueling Systems Inc. of Madison, Wis.

Monitor 104 of monitoring system 100 is configured to automatically and routinely collect data indicative of a corrosive environment in fuel delivery system 10. In operation, monitor 104 may draw in a liquid or vapor sample from fuel delivery system 10 and directly test the sample or test a target material that has been exposed to the sample, for example. In certain embodiments, monitor 104 operates continuously, collecting samples and measuring data approximately once every second or minute, for example. Monitor 104 is also configured to communicate the collected data to controller 102. In certain embodiments, monitor 104 manipulates the data before sending the data to controller 102. In other embodiments, monitor 104 sends the data to controller 102 in raw form for manipulation by controller 102. The illustrative monitor 104 is wired to controller 102, but it is also within the scope of the present disclosure that monitor 104 may communicate wirelessly (e.g., via an internet network) with controller 102.

Depending on the type of data being collected by each monitor 104, the location of each monitor 104 in fuel delivery system 10 may vary. Returning to the illustrated embodiment of FIG. 2, for example, monitor 104' is positioned in the liquid space (e.g, middle or bottom) of storage tank 16 to collect data regarding the liquid fuel product 14 in storage tank 16, monitor 104" is positioned in the ullage or vapor space (e.g., top) of storage tank 16 to collect data regarding any vapors present in storage tank 16, monitor 104''' is positioned in the liquid space (e.g., bottom) of turbine sump 32 to collect data regarding any liquids present in turbine sump 32, and monitor 104'''' is positioned in the vapor space (e.g., top) of turbine sump 32 to collect data regarding any vapors present in turbine sump 32. Monitor 104 may be positioned in other suitable locations of fuel delivery system 10, including delivery line 18 and dispenser sump 30 (FIG. 1), for example. Various monitors 104 for use in monitoring system 100 of FIG. 3 are discussed further below.

Output 106 of monitoring system 100 is capable of communicating an alarm or warning from controller 102 to an operator. Output 106 may be in the form of a visual indication device (e.g., a gauge, a display screen, lights, a printer), an audio indication device (e.g., a speaker, an audible alarm), a tactile indication device, or another suitable device for communicating information to the operator, as well as combinations thereof. The illustrative output 106 is wired to controller 102, but it is also within the scope of the present disclosure that output 106 may communicate wirelessly (e.g., via an internet network) with controller 102. To facilitate communication between output 106 and the operator, output 106 may be located in the operator's control room or office, for example.

In operation, and as discussed above, controller 102 collects, sorts, and/or analyzes data from monitor 104, determines an appropriate response, and communicates the response to output 106. According to an exemplary embodiment of the present disclosure, output 106 warns the operator of a corrosive environment in fuel delivery system 10 before the occurrence of any corrosion or any significant corrosion in fuel delivery system 10. In this embodiment, corrosion may be prevented or minimized. It is also within the scope of the present disclosure that output 106 may alert the operator to the occurrence of corrosion in fuel delivery system 10 to at least avoid further corrosion.

Various factors may influence whether controller 102 issues an alarm or warning from output 106 that a corrosive environment is present in fuel delivery system 10. One factor includes the concentration of acidic molecules in fuel delivery system 10, with controller 102 issuing an alarm or warning from output 106 when the measured concentration of acidic molecules in fuel delivery system 10 exceeds an acceptable concentration of acidic molecules in fuel delivery system 10. The concentration may be expressed in various units. For example, controller 102 may activate output 106 when the measured concentration of acidic molecules in fuel delivery system 10 exceeds 25 ppm, 50 ppm, 100 ppm, 150 ppm, 200 ppm, or more, or when the measured concentration of acidic molecules in fuel delivery system 10 exceeds 25 mg/L, 50 mg/L, 100 mg/L, 150 mg/L, 200 mg/L, or more. At or beneath the acceptable concentration, corrosion in fuel to delivery system 10 may be limited. Another factor includes the concentration of hydrogen ions in fuel delivery system 10, with controller 102 issuing an alarm or warning from output 106 when the measured concentration of hydrogen ions in fuel delivery system 10 exceeds an acceptable concentration of hydrogen ions in fuel delivery system 10. For example, controller 102 may activate output 106 when the hydrogen ion concentration causes the pH in fuel delivery system 10 to drop below 5, 4, 3, or 2, for example. Within the acceptable pH range, corrosion in fuel delivery system 10 may be limited. Yet another factor includes the concentration of bacteria in fuel delivery system 10, with controller 102 issuing an alarm or warning from output 106 when the measured concentration of bacteria in fuel delivery system 10 exceeds an acceptable concentration of bacteria in fuel delivery system 10. At or beneath the acceptable concentration, the production of corrosive materials in fuel delivery system 10 may be limited.

Controller 102 may be programmed to progressively vary the alarm or warning communication from output 106 as the risk of corrosion in fuel delivery system 10 increases. For example, controller 102 may automatically trigger a minor alarm (e.g., a blinking light) when monitor 104 detects a relatively low acid concentration level (e.g., 5 ppm) in fuel delivery system 10, a moderate alarm (e.g., an audible alarm) when monitor 104 detects a moderate acid concentration level (e.g., 10 ppm) in fuel delivery system 10, and a severe alarm (e.g., a telephone call or an e-mail to the gas station operator) when monitor 104 detects a relatively high acid concentration level (e.g., 25 ppm) in fuel delivery system 10.

The alarm or warning communication from output 106 allows the operator to take precautionary or corrective measures to limit corrosion of fuel delivery system 10. For example, if an alarm or warning communication is signaled from turbine sump 32 (FIG. 2), the operator may remove manhole cover 39 and lid 38 to clean turbine sump 32, which may involve removing bacteria and potentially corrosive liquids and vapors from turbine sump 32. As another example, the operator may inspect fuel delivery system 10 for a liquid leak or a vapor leak that allowed ethanol and/or its acidic reaction products to enter turbine sump 32 in the first place.

As discussed above, monitoring system 100 includes one or more monitors 104 that collect data indicative of a corrosive environment in fuel delivery system 10. Each monitor 104 may vary in the type of data that is collected, the type of sample that is evaluated for testing, and the location of the sample that is evaluated for testing, as exemplified below.

Figure 4:
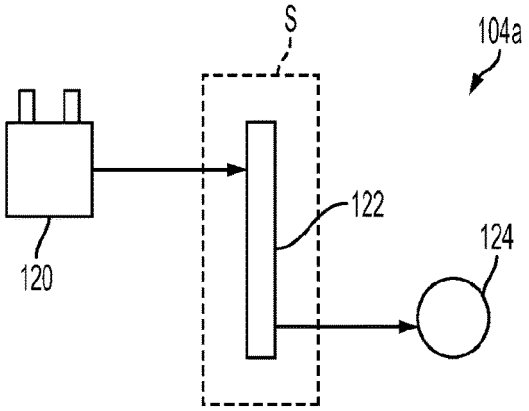
FIG. 4 is a schematic view of a first exemplary monitor for use in the monitoring system of FIG. 3.

In one embodiment, monitor 104 collects electrical data indicative of a corrosive environment in fuel delivery system 10. An exemplary electrical monitor 104a is shown in FIG. 4 and includes an energy source 120, a corrosive target material 122 that is exposed to a liquid or vapor sample S from fuel delivery system 10, and a sensor 124. Target material 122 may be designed to corrode before the equipment of fuel delivery system 10 corrodes. Target material 122 may be constructed of or coated with a material that is susceptible to acidic corrosion, such as copper or low carbon steel. Also, target material 122 may be relatively thin or small in size compared to the equipment of fuel delivery system 10 such that even a small amount of corrosion will impact the structural integrity of target material 122. For example, target material 122 may be in the form of a thin film or wire.

In use, energy source 120 directs an electrical current through target material 122. When target material 122 is intact, sensor 124 senses the electrical current traveling through target material 122. However, when exposure to sample S causes target material 122 to corrode and potentially break, sensor 124 will sense a decreased electrical current, or no current, traveling through target material 122. It is also within the scope of the present disclosure that the corrosion and/or breakage of target material 122 may be detected visually, such as by using a camera as sensor 124. First monitor 104a may share the data collected by sensor 124 with controller 102 (FIG. 3) to signal a corrosive environment in fuel delivery system 10.

Figure 5:
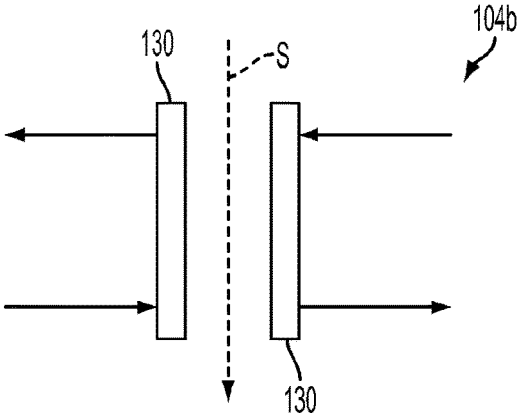
FIG. 5 is a schematic view of a second exemplary monitor for use in the monitoring system of FIG. 3.

Another exemplary electrical monitor 104b is shown in FIG. 5 and includes opposing, charged metal plates 130. The electrical monitor 104b operates by measuring electrical properties (e.g., capacitance, impedance) of a liquid or vapor sample S that has been withdrawn from fuel delivery system 10. In the case of a capacitance monitor 104b, for example, the sample S is directed between plates 130. Knowing the size of plates 130 and the distance between plates 130, the dielectric constant of the sample S may be calculated. As the quantity of acetate or acetic acid in the sample S varies, the dielectric constant of the sample S may also vary. The electrical monitor 104b may share the collected data with controller 102 (FIG. 3) to signal a corrosive environment in fuel delivery system 10.

In another embodiment, monitor 104 collects electrochemical data indicative of a corrosive environment in fuel delivery system 10. An exemplary electrochemical monitor (not shown) performs potentiometric titration of a sample that has been withdrawn from fuel delivery system 10. A suitable potentiometric titration device includes an electrochemical cell with an indicator electrode and a reference electrode that maintains a consistent electrical potential. As a titrant is added to the sample and the electrodes interact with the sample, the electric potential across the sample is measured. Potentiometric or chronopotentiometric sensors, which may be based on solid-state reversible oxide films, such as that of iridium, may be used to measure potential in the cell. As the concentration of acetate or acetic acid in the sample varies, the potential may also vary. The potentiometric titration device may share the collected data with controller 102 (FIG. 3) to signal a corrosive environment in fuel delivery system 10. An electrochemical monitor may also operate by exposing the sample to an electrode, performing a reduction-oxidation with the sample at the electrode, and measuring the resulting current, for example.

Figure 6:
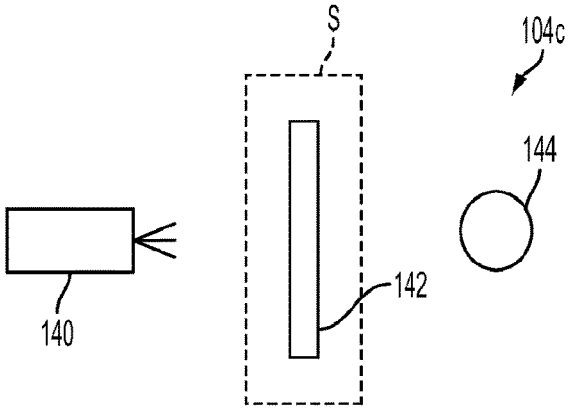
FIG. 6 is a schematic view of a third exemplary monitor for use in the monitoring system of FIG. 3.

In yet another embodiment, monitor 104 collects optical data indicative of a corrosive environment in fuel delivery system 10. An exemplary optical monitor 104c is shown in FIG. 6 and includes a light source 140, an optical target material 142 that is exposed to a liquid or vapor sample S from fuel delivery system 10, and an optical detector 144. Target material 142 may be constructed of or coated with a material (e.g., an acid-sensitive polymer) that changes optical properties (e.g., color) in the presence of $H^+$ protons from the sample S. Suitable target materials 142 include pH indicators that change color when target material 142 is exposed to an acidic pH, such as a pH less than about 5, 4, 3, or 2, for example. The optical properties of target material 142 may be configured to change before the equipment of fuel delivery system 10 corrodes. Detector 144 may use optical fibers as the sensing element (i.e., intrinsic sensors) or as a means of relaying signals to a remote sensing element (i.e., extrinsic sensors).

In use, light source 140 directs a beam of light toward target material 142. Before target material 142 changes color, for example, detector 144 may detect a certain reflection, transmission (i.e., spectrophotometry), absorbtion (i.e., densitometry), and/or refraction of the the light beam from target material 142. However, after target material 142 changes color, detector 144 will detect a different reflection, transmission, absorbtion, and/or refraction of the the light beam. It is also within the scope of the present disclosure that the changes in target material 142 may be detected visually, such as by using a camera as detector 144. Third monitor 104c may share the data collected by detector 144 with controller 102 (FIG. 3) to signal a corrosive environment in fuel delivery system 10.

In still yet another embodiment, monitor 104 collects spectroscopic data indicative of a corrosive environment in fuel delivery system 10. An exemplary spectrometer (not shown) operates by subjecting a liquid or vapor sample from fuel delivery system 10 to an energy source and measuring the radiative energy as a function of its wavelength and/or frequency. Suitable spectrometers include, for example, infrared (IR) electromagnetic spectrometers, ultraviolet (UV) electromagnetic spectrometers, gas Chromatography-mass spectrometers (GC-MS), and nuclear magnetic resonance (NMR) spectrometers. Suitable spectrometers may detect absorption from a ground state to an excited state, and/or fluorescence from the excited state to the ground state. The spectroscopic data may be represented by a spectrum showing the radiative energy as a function of wavelength and/or frequency. It is within the scope of the present disclosure that the spectrum may be edited to hone in on certain impurities in the sample, such as acetate and acetic acid, which may cause corrosion in fuel delivery system 10, as well as sulfuric acid, which may cause odors in fuel delivery system 10. As the impurities develop in fuel delivery system 10, peaks corresponding to the impurities would form and/or grow on the spectrum. The spectrometer may share the collected data with controller 102 (FIG. 3) to signal a corrosive environment in fuel delivery system 10.

In still yet another embodiment, monitor 104 collects microbial data indicative of a corrosive environment in fuel delivery system 10. An exemplary microbial detector (not shown) operates by exposing a liquid or vapor sample from fuel delivery system 10 to a fluorogenic enzyme substrate, incubating the sample and allowing any bacteria in the sample to cleave the enzyme substrate, and measuring fluorescence produced by the cleaved enzyme substrate. The concentration of the fluorescent product may be directly related to the concentration of acetic acid producing bacteria (e.g., Acetobacter, Gluconobacter) in the sample. Suitable microbial detectors are commercially available from Mycometer, Inc. of Tampa, Fla. The microbial detector may share the collected data with controller 102 (FIG. 3) to signal a corrosive environment in fuel delivery system 10.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel delivery system comprising:

a storage tank containing a fuel product;

a fuel delivery line in communication with the storage tank and with a fuel dispenser for dispensing the fuel product to a consumer;

at least one monitor that collects data indicative of a corrosive environment in the fuel delivery system, wherein the at least one monitor is an electrical monitor comprising:

a target material configured to be exposed to a sample from the fuel delivery system;

an energy source directing an electrical current through the target material; and a sensor configured to detect a decrease in the electrical current through the target material, the decrease in electrical current indicating the presence of a corrosive environment in the fuel delivery system; and a controller in communication with the at least one monitor to receive collected data from the at least one monitor, the controller being programmed to issue a warning based on the collected data from the at least one monitor, wherein the controller is programmed to issue the warning based on a decrease in the electrical current through the target material.

2. The fuel delivery system of claim 1, further comprising at least one underground sump that houses a portion of the fuel delivery line, wherein the at least one monitor is positioned in the at least one underground sump to collect data regarding at least one of a liquid or a vapor sample present in the at least one underground sump.

3. The fuel delivery system of claim 1, wherein the at least one monitor is positioned in the storage tank to collect data regarding at least one of the fuel product or a vapor present in the storage tank.

4. The fuel delivery system of claim 1, wherein the controller is programmed to issue: a first warning when the at least one monitor measures a relatively low corrosion level; and a second warning more severe than the first warning when the at least one monitor measures a relatively high corrosion level.

5. The fuel delivery system of claim 1, wherein the target material comprises at least one material susceptible to acidic corrosion selected from the group consisting of copper and low carbon steel.

6. A method of monitoring the fuel delivery system of claim 1, the method comprising the steps of: directing the fuel product from the storage tank to the fuel dispenser via the fuel delivery line collecting data indicative of a corrosive environment in the fuel delivery system with the monitor; and issuing the warning based on the collected data.

7. The method of claim 6, wherein said collecting step further comprises: drawing the sample from the fuel the delivery system; and testing the drawn sample to measure a property indicative of the presence of a corrosive environment.

8. A fuel delivery system comprising:

a storage tank containing a fuel product;

a fuel delivery line in communication with the storage tank and with a fuel dispenser for dispensing the fuel product to a consumer;

at least one monitor [that collects] *positioned in a vapor space of the fuel delivery system, the at least one monitor configured to collect* data indicative of a corrosive environment in *a vapor sample from the vapor space of* the fuel delivery system, wherein the at least one monitor is an electrical monitor comprising:

at least two opposing, charged metal plates; and a sensor operatively connected to the two opposing, charged metal plates configured to determine a measured value of an electrical property of [a] *the vapor* sample from *the vapor space of* the fuel delivery system positioned between the at least two opposing, charged metal plates, the electrical property having a predetermined value indicating the presence of a corrosive environment in *the vapor space of* the fuel delivery system; and a controller in communication with the at least one monitor to receive collected data from the at least one monitor, the controller being programmed to issue a warning *indicating the presence of the corrosive environment in the vapor space of the fuel delivery system* based on the collected data from the at least one monitor, wherein the controller is programmed to issue the warning based on a comparison of the predetermined value and the measured value of the electrical property.

9. The fuel delivery system of claim 8, further comprising at least one underground sump that houses a portion of the fuel delivery line, wherein the at least one monitor is positioned in *the vapor space of* the at least one underground sump [to collect data regarding at least one of a liquid or a vapor sample present in the at least one underground sump].

10. The fuel delivery system of claim 8, wherein the at least one monitor is positioned in *the vapor space of* the storage tank [to collect data regarding at least one of the fuel product or a vapor present in the storage tank].

11. The fuel delivery system of claim 8, wherein the controller is programmed to issue: a first warning when the at least one monitor measures a relatively low corrosion level; and a second warning more severe than the first warning when the at least one monitor measures a relatively high corrosion level.

12. A method of monitoring the fuel delivery system of claim 8, the method comprising the steps of:

directing the fuel product from the storage tank to the fuel dispenser via the fuel delivery line;

collecting data indicative of [a] *the* corrosive environment in *the vapor space of* the fuel delivery system with the monitor; and issuing the warning based on the collected data.

13. The method of claim 12, wherein said collecting step further comprises:

drawing the *vapor* sample from *the vapor space of* the fuel delivery system; and testing the drawn *vapor* sample to measure a property indicative of the presence of [a] *the* corrosive environment.

[14. A fuel delivery system comprising:

a storage tank containing a fuel product;

a fuel delivery line in communication with the storage tank and with a fuel dispenser for dispensing the fuel product to a consumer;

at least one monitor that collects data indicative of a corrosive environment in the fuel delivery system, wherein the at least one monitor is a microbial monitor comprising:

a microbial detector configured to expose a sample from the fuel delivery system to a flurogenic enzyme substrate and measure a concentration of fluorescence produced from bacteria cleaved to the flurogenic enzyme substrate, where the concentration of fluorescence having a predetermined value indicating the presence of a corrosive environment in the fuel delivery system; and a controller in communication with the at least one monitor to receive collected data from the at least one monitor, the controller being programmed to issue a warning based on the collected data from the at least one monitor, wherein the controller is programmed to issue the warning based on the measured concentration of fluorescence.]

[15. The fuel delivery system of claim 14, further comprising at least one underground sump that houses a portion of the fuel delivery line, wherein the at least one monitor is positioned in the at least one underground sump to collect data regarding at least one of a liquid or a vapor sample present in the at least one underground sump.]

[16. The fuel delivery system of claim 14, wherein the at least one monitor is positioned in the storage tank to collect data regarding at least one of the fuel product or a vapor present in the storage tank.]

[17. The fuel delivery system of claim 14, wherein the controller is programmed to issue: a first warning when the at least one monitor measures a relatively low corrosion level; and a second warning more severe than the first warning when the at least one monitor measures a relatively high corrosion level.]

[18. A method of monitoring the fuel delivery system of claim 14, the method comprising the steps of: directing the fuel product from the storage tank to the fuel dispenser via the fuel delivery line; collecting data indicative of a corrosive environment in the fuel delivery system with the monitor; and issuing the warning based on the collected data.]

[19. The method of claim 18, wherein said collecting step further comprises: drawing the sample from the fuel the delivery system; and testing the drawn sample to measure a property indicative of the presence of a corrosive environment.]

*20. A fuel delivery system comprising:*

*a storage tank containing a fuel product;*

*a fuel delivery line in communication with the storage tank and with a fuel dispenser for dispensing the fuel product to a consumer;*

*at least one monitor positioned in a vapor space of the fuel delivery system that collects data indicative of a corrosive environment including acetic acid in the vapor space of the fuel delivery system, wherein the at least one monitor comprises:*

*a metallic target material configured to be exposed to a sample from the fuel delivery system, the metallic target material being susceptible to acidic corrosion such that the metallic target material corrodes when exposed to the acetic acid in the fuel delivery system before the fuel delivery system corrodes; and*

*a sensor configured to detect the corrosion of the target material; and*

*a controller in communication with the at least one monitor to receive collected data from the at least one monitor, the controller being programmed to issue a warning based on the collected data from the at least one monitor, wherein the controller is programmed to issue the warning based on the detected corrosion of the target material.*

*21. The fuel delivery system of claim 20, wherein the metallic target material comprises copper or low carbon steel.*

*22. The fuel delivery system of claim 20, wherein the metallic target material is a thin film or wire.*

*23. The fuel delivery system of claim 20, wherein the sensor is a camera.*

*24. The fuel delivery system of claim 20, wherein the at least one monitor is positioned in the vapor space of an underground sump or the vapor space of the storage tank.*

*25. The fuel delivery system of claim 20, further comprising an energy source that directs an electrical current through the target material, the sensor being configured to detect the electrical current traveling through the target material.*

* * * * *